United States Patent [19]
Monette et al.

[11] Patent Number: 6,039,389
[45] Date of Patent: Mar. 21, 2000

[54] STABILIZATION SYSTEM FOR LIFTGATE

[75] Inventors: Dave R. Monette, Eastpointe; Randall D. Kirk, Waterford, both of Mich.

[73] Assignee: Chrysler Corporation, Auburn Hills, Mich.

[21] Appl. No.: 09/021,007

[22] Filed: Feb. 9, 1998

Related U.S. Application Data

[60] Provisional application No. 60/068,388, Dec. 22, 1997, abandoned.

[51] Int. Cl.⁷ ........................................................ B60J 5/00
[52] U.S. Cl. ............................................................ 296/207
[58] Field of Search .................................... 296/56, 146.9, 296/207; 16/72, 86 A, 86 B, 86 R

[56] References Cited

U.S. PATENT DOCUMENTS

| | | |
|---|---|---|
| 2,024,100 | 12/1935 | Kahn . |
| 2,760,223 | 8/1956 | Walz . |
| 2,848,272 | 8/1958 | Storch . |
| 3,534,433 | 10/1970 | Himka et al. . |
| 4,178,658 | 12/1979 | Gergonne ................................. 16/86 R |
| 4,192,039 | 3/1980 | Haberle et al. . |
| 4,261,612 | 4/1981 | Chrysler et al. . |
| 4,341,414 | 7/1982 | Chiba . |
| 4,343,504 | 8/1982 | Tomioka et al. . |
| 4,472,857 | 9/1984 | Guionie et al. . |
| 4,799,730 | 1/1989 | Harasaki . |
| 5,421,124 | 6/1995 | Zuccaro . |
| 5,549,351 | 8/1996 | Park .......................................... 296/207 |
| 5,584,528 | 12/1996 | Cozzani ................................... 296/207 |

*Primary Examiner*—D. Glenn Dayoan
*Assistant Examiner*—Lori L. Coletta
*Attorney, Agent, or Firm*—Roland A. Fuller, III

[57] ABSTRACT

A stabilization system for stabilizing an openable member of a motor vehicle relative to vehicle structure of the motor vehicle when in a closed position. The stabilization system includes a first member for mounting on one of the openable member or the vehicle structure and a second member for mounting on the other of the openable member or the vehicle structure. The first member includes a generally solid base portion for mounting on the one of the openable member or the vehicle structure and a generally hollow outer portion. The second member includes a base portion for mounting on the other one of the openable member or the vehicle structure and a tapered outer portion. The tapered outer portion is pressed against the hollow outer portion of the first member when the openable member is in the closed position such that the hollow outer portion winks over the tapered outer portion of the second member and secures the second member thereagainst to prevent movement of the second member in at least two directions with respect to the first member.

20 Claims, 2 Drawing Sheets

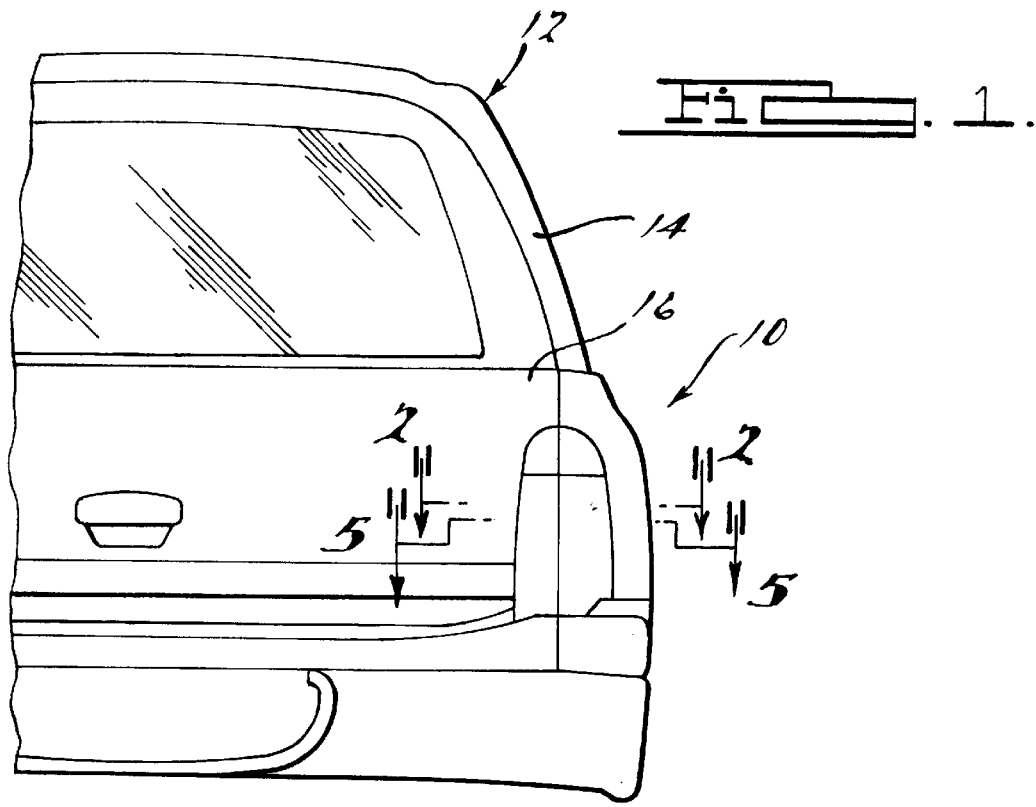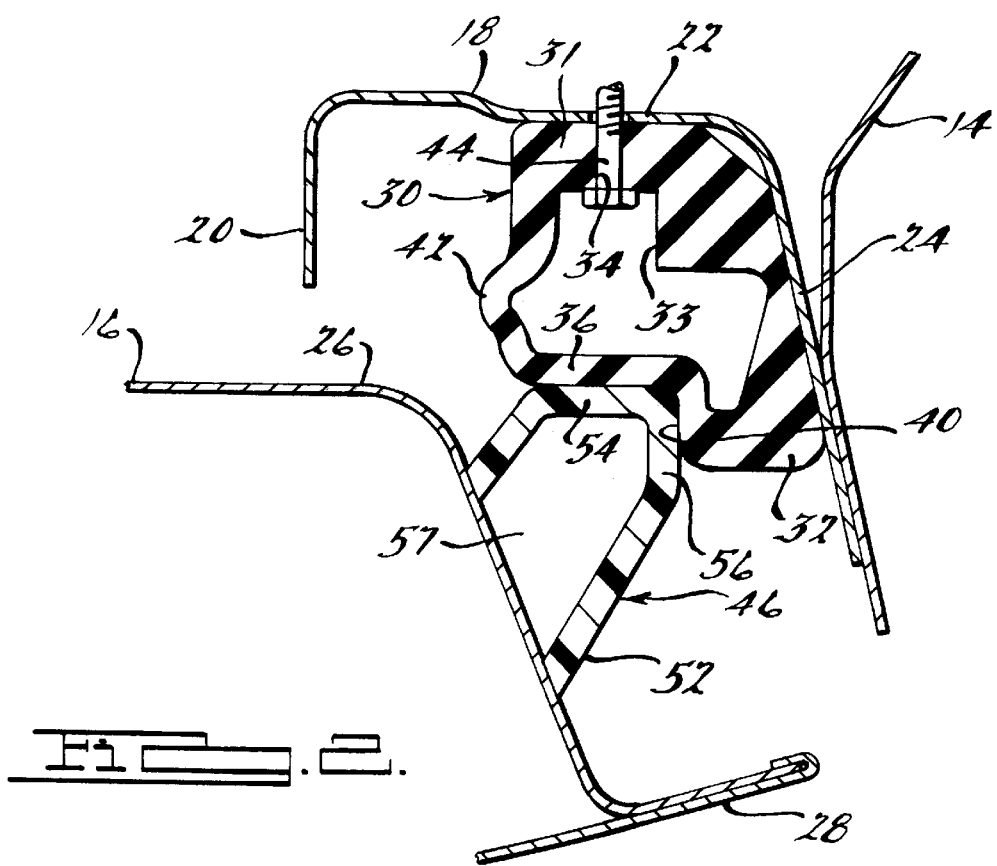

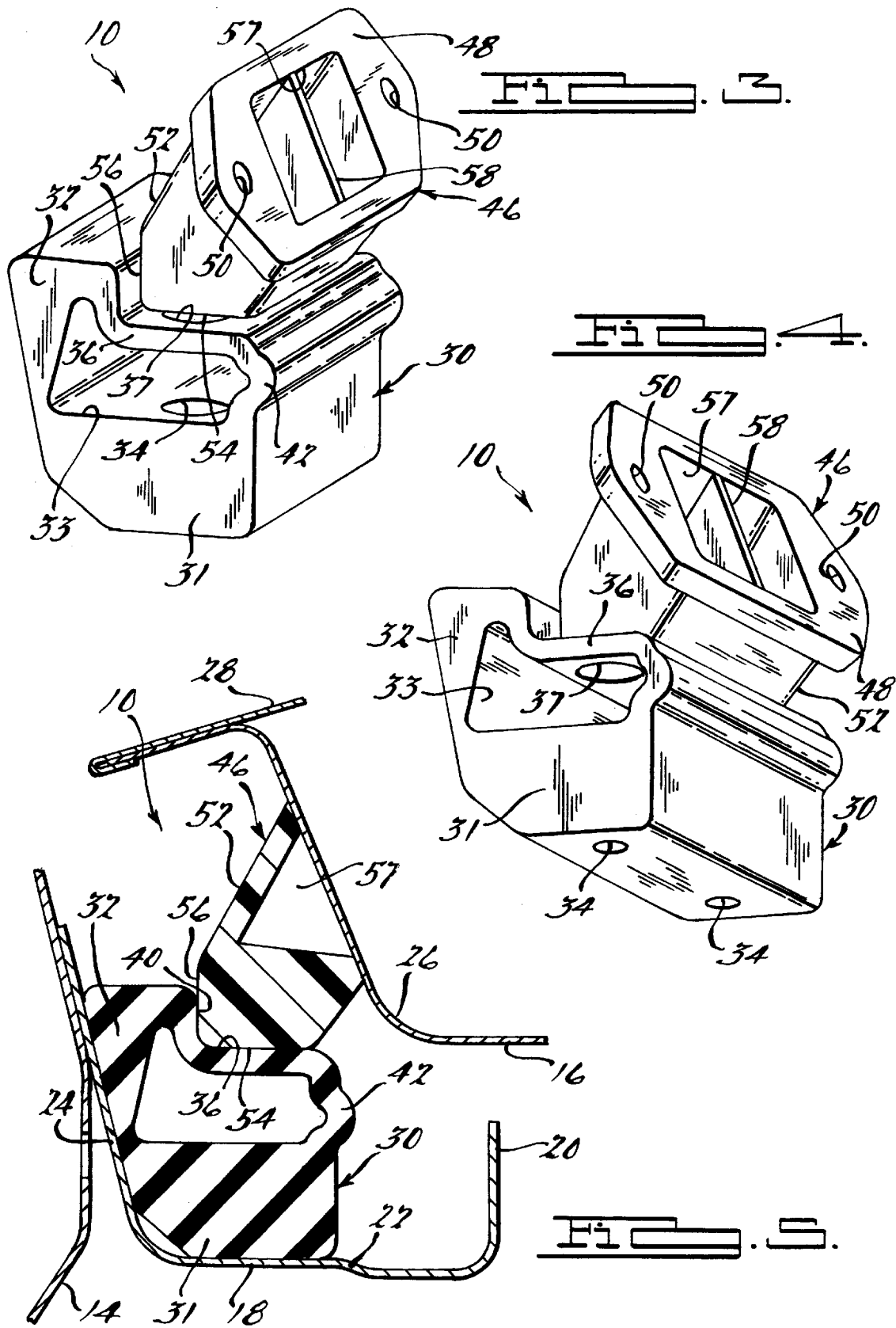

STABILIZATION SYSTEM FOR LIFTGATE

This application is a U.S. patent application based on U.S. Provisional Patent Application Ser. No. 60/068,388 having the same title, filed Dec. 22, 1997, (now abandoned). priority to which is claimed:

BACKGROUND OF THE INVENTION

1. Field of the Invention

The present invention relates generally to openable members of vehicles and, more particularly, to a stabilization system for stabilizing a liftgate of a motor vehicle.

2. Description of the Related Art

Vehicles such as motor vehicles are typically provided with at least one openable member such as a liftgate for access to an occupant compartment of the motor vehicle. The liftgate is typically hinged to vehicle structure such as a vehicle body of the motor vehicle to allow pivotal movement of the liftgate and includes a latching mechanism to secure the liftgate to the vehicle body when closed.

In recent years, stabilization of the liftgate has become an increasingly large target to reduce noise attenuation of the motor vehicle. To accomplish a reduction in noise attenuation, the liftgate should be prevented from traveling cross-vehicle and fore/aft and vertically during various body twist frequency sweeps of the motor vehicle. One attempt at stabilizing the liftgate was to use a spring loaded plastic bumper on each side of the liftgate which would, in turn, mate with rubber stop pads. However, these bumpers and pads only provided cross-vehicle stabilization to prevent the liftgate from being excited beyond its own natural frequency into a state of impending motion. These bumpers and pads did not control movement in the fore/aft and up/down directions of the motor vehicle.

SUMMARY OF THE INVENTION

It is, therefore, one object of the present invention to provide a stabilization system for stabilizing an openable member of a motor vehicle.

It is another object of the present invention to provide a stabilization system for stabilizing a liftgate of a motor vehicle to reduce cross-vehicle, fore/aft and vertical movement of the liftgate.

It is yet another object of the present invention to provide a stabilization system for stabilizing a liftgate of a motor vehicle that is able to fit into tight packaging areas.

To achieve the foregoing objects, the present invention is a stabilization system for stabilizing an openable member of a motor vehicle relative to vehicle structure of the motor vehicle when in a closed position. The stabilization system includes a first member for mounting on one of the openable member and the vehicle structure and a second member for mounting on the other of the openable member and the vehicle structure. The first member has a generally solid base portion for mounting on the one of the openable member and the vehicle structure and a generally hollow outer portion. The second member has a base portion for mounting on the other one of the openable member and the vehicle structure and a tapered outer portion. The tapered outer portion is pressed against the hollow outer portion of the first member when the openable member is in the closed position such that the hollow outer portion winks over the tapered outer portion of the second member and secures the second member thereagainst to prevent movement of the second member in at least two directions with respect to the first member.

One advantage of the present invention is that a stabilization system is provided for stabilizing an openable member of a motor vehicle. Another advantage of the present invention is that the stabilization system is provided for stabilizing a liftgate of the motor vehicle. Yet another advantage of the present invention is that the stabilization system is able to fit into tight packaging areas of the motor vehicle. Still another advantage of the present invention is that the stabilization system reduces cross-vehicle movement of the liftgate. A further advantage of the present invention is that the stabilization system reduces fore/aft liftgate chucking of a latch/striker combination for the liftgate. Yet a further advantage of the present invention is that the stabilization system reduces vertical displacement of the liftgate. Still a further advantage of the present invention is that the stabilization system is an effective integrated two-piece system without the aid of mechanical parts.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a partial elevational view of a stabilization system, according to the present invention, illustrated in operational relationship with a liftgate of a motor vehicle.

FIG. 2 is a sectional view taken along line 2–2 of FIG. 1.

FIG. 3 is a first perspective view of the stabilization system of FIG. 1.

FIG. 4 is a second perspective view of the stabilization system of FIG. 1.

FIG. 5 is a sectional view taken along line 5–5 of FIG. 1.

DESCRIPTION OF THE PREFERRED EMBODIMENT(S)

Referring to the drawings and in particular FIG. 1, a stabilization system 10, according to the present invention, is illustrated in operational relationship with a motor vehicle, generally indicated at 12. The motor vehicle 12 includes vehicle structure such as a vehicle body 14 and an openable member such as a liftgate 16 pivotally attached to the vehicle body 14 by suitable means such as hinges (not shown). The stabilization system 10 is used to stabilize the liftgate 16 relative to the vehicle body 14 when in a closed position.

As illustrated in FIG. 2, the vehicle body 14 includes a drain trough 18. The drain trough 18 includes a first side wall 20, a base wall 22 generally perpendicular to the first side wall 20 and a second side wall 24 at an angle to the base wall 22 to form a generally "U" cross-sectional shape. Preferably, the first side wall 20, base wall 22 and second side wall 24 are integral, unitary and formed as one-piece. It should be appreciated that the drain trough 18 may include a seal (not shown) on an end of the first side wall 20 to seal a gap or space between the liftgate 16 and drain trough 18.

The liftgate 16 includes an inner panel 26 and an outer panel 28 joined together at one end by suitable means such as welding to form a hem flange joint. It should be appreciated that the liftgate 16 and drain trough 18 are conventional and known in the art.

Referring to FIGS. 2 through 5, the stabilization system 10 includes a first member, generally indicated at 30, disposed in the drain trough 18. The first member 30 is generally rectangular in shape and extends transversely to form a block. The first member 30 has a generally solid base portion 31 for mounting against the base wall 22 and an outer portion 32 having a portion for mounting against the second side wall 24. The outer portion 32 has an aperture 33 extending therethrough to render the outer portion 32 generally hollow. The first member 30 is made of a resilient material such as rubber or PVC or product or the like. The base portion 31 includes at least one, preferably a pair of apertures 34 extending therethrough for a function to be described. The outer portion 32 includes a generally planar step portion 36 having at least one, preferably a pair of apertures 38 to allow a fluid such as water to pass therethrough. The outer portion 32 also includes a generally planar shoulder portion 40 perpendicular to the step portion 36. The outer portion 32 further includes a rib portion 42 interconnecting the step portion 36 and base portion 31. It should be appreciated that the first member 30 is used on each transverse side of the drain trough 18.

The stabilization system 10 includes at least one, preferably a pair of fasteners 44 for mounting or securing the first member 30 to the base wall 22 of drain trough 18. In this example, the fastener 44 is a bolt which passes through a dumbbell shaped plate (not shown) and the aperture 34 and threadably engages a nut (not shown).

The stabilization system 10 further includes a second member, generally indicated at 46, for mounting on the liftgate 16. The second member 46 is a generally rectangular block extending transversely. The second member 46 is made of a generally rigid material such as plastic, PVC, metal (ferrous or non-ferrous), or formed into the inner panel 26 of the liftgate 16. The second member 46 has a base portion 48 extending transversely for mounting against the inner panel 26 of the liftgate 16. The base portion 48 includes at least one, preferably a pair of apertures 50 extending therethrough to receive fasteners (not shown) such as bolts to secure the base portion 48 to the inner panel 26 of the liftgate 16. The second member 46 also includes a tapered outer portion 52 extending outwardly at an angle from the base portion 48. The tapered outer portion 52 has a generally planar first portion 54 to contact the step portion 36 of the first member 30 and a generally planar second portion 56 generally perpendicular to the first portion 54 to contact the shoulder portion 40 of the first member 30. Preferably, the tapered outer portion 52 has a generally hollow cavity 57 and a wall or rib 58 dividing the cavity 57. It should be appreciated that the second member 46 is used on each transverse side of the liftgate 16. It should also be appreciated that the first member 30 could be used on each transverse side of the liftgate 16 and the second member 46 could be used on each transverse side of the drain trough 18.

In operation, the stabilization systems 10 has the first member 30 secured to the drain trough 18 and the second member 46 secured to the liftgate 16 on each transverse or cross-vehicle side of the motor vehicle 12. When the liftgate 16 is moved to a closed position such that the inner panel 26 is adjacent the drain trough 18, the tapered outer portion 52 is pressed against the hollow outer portion 32 of the first member 30 and winks over the hollow outer portion 32. The first portion 54 contacts and abuts the step portion 36 and the second portion 56 contacts and abuts the shoulder portion 40. This engagement secures the second member 46 against the first member 30 and reduces or prevents movement of the second member 46 in at least two directions with respect to the first member 30. Preferably, the first member 30 restricts movement of the second member 46 in the cross-vehicle, fore/aft and vertical directions.

Accordingly, the stabilization system 10 reduces liftgate to D-pillar displacement which calculates to approximately a 71.8% reduction in movement from the 8.0 to 16.0 Hz frequency range and approximately a 38.3% reduction for the vertical direction in the same frequency range. The stabilization system 10 decreases directional movement of the liftgate 16, effectively reducing noise and vibration. The stabilization system 10 provides a quieter occupant compartment during vehicle operation.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A stabilization system for stabilizing an openable member relative to vehicle structure of a motor vehicle when in a closed position comprising:

a first member for mounting on either the openable member of the vehicle structure;

a second member for mounting on the other of the openable member or the vehicle structure;

said first member having a generally solid base portion for mounting on the one of the openable member and the vehicle structure and a generally hollow outer portion;

said second member having a base portion for mounting on the other one of the openable member or the vehicle structure and a tapered outer portion, said tapered outer portion being pressed against said hollow outer portion of said first member when the openable member is in the closed position such that said hollow outer portion winks over said tapered outer portion of said second member and secures said second member thereagainst to prevent movement of said second member in at least two directions with respect to said first member.

2. A stabilization system as set forth in claim 1 wherein said first member has a generally planar step portion.

3. A stabilization system for stabilizing an openable member relative to vehicle structure of a motor vehicle when in a closed position comprising:

a first member for mounting on either the openable member of the vehicle structure;

a second member for mounting on the other of the openable member or the vehicle structure;

said first member having a generally solid base portion for mounting on the one of the openable member and the vehicle structure and a generally hollow outer portion;

said second member having a base portion for mounting on the other one of the openable member and the vehicle structure and a tapered outer portion, said tapered outer portion being pressed against said hollow outer portion of said first member when the openable member is in the closed position such that said hollow outer portion winks over said tapered outer portion of said second member and secures said second member thereagainst to prevent movement of said second member in at least two directions with respect to said first member;

wherein said first member has a generally planar step portion; and wherein said step portion has at least one aperture extending therethrough.

4. A stabilization system as set forth in claim 2 wherein said outer portion of said first member has a generally planar shoulder portion perpendicular to said step portion.

5. A stabilization system for stabilizing an openable member relative to vehicle structure of a motor vehicle when in a closed position comprising:

a first member for mounting on either the openable member of the vehicle structure;

a second member for mounting on the other of the openable member and the vehicle structure;

said first member having a generally solid base portion for mounting on the one of the openable member and the vehicle structure and a generally hollow outer portion;

said second member having a base portion for mounting on the other one of the openable member and the vehicle structure and a tapered outer portion, said tapered outer portion being pressed against said hollow outer portion of said first member when the openable member is in the closed position such that said hollow outer portion winks over said tapered outer portion of said second member and secures said second member thereagainst to prevent movement of said second member in at least two directions with respect to said first member;

wherein said first member has a generally planar step portion; and wherein said outer portion of said first member has a rib portion interconnecting said base portion and said step portion.

6. A stabilization system as set forth in claim 1 wherein said first member is a block formed of a resilient material.

7. A stabilization system as set forth in claim 1 wherein said second member is a block formed of a rigid material.

8. A stabilization system as set forth in claim 1 wherein said base portion of said second member has at least one aperture extending therethrough.

9. A stabilization system as set forth in claim 1 wherein said tapered outer portion of said second member extends outwardly at an angle from said base portion.

10. A stabilization system as set forth in claim 1 wherein said tapered outer portion of said second member has a generally planar first portion and a generally planar second portion generally perpendicular to said first portion.

11. A stabilization system as set forth in claim 1 wherein said tapered outer portion of said second member has a cavity and a wall to divide said cavity.

12. A stabilization system as set forth in claim 1 wherein said base portion of said first member has at least one aperture extending therethrough and at least one fastener passing through said at least one aperture to secure said base portion to one of the openable member and the vehicle structure.

13. A stabilization system for stabilizing a liftgate relative to vehicle structure of a motor vehicle when in a closed position comprising:

a first member for mounting on either the liftgate of the vehicle structure;

a second member for mounting on the other of the liftgate or the vehicle structure;

said first member comprising a block formed of a resilient material having a generally solid base portion for mounting on one the liftgate and the vehicle structure and a generally hollow outer portion;

said second member comprising a block formed from a generally rigid material having a base portion for mounting on other one the liftgate and the vehicle structure and a tapered outer portion, said tapered outer portion being pressed against said hollow outer portion of said first member when the liftgate is in the closed position such that said hollow outer portion winks over overlaps said tapered outer portion of said second member and secures said second member thereagainst to prevent movement of said second member in at least two directions with respect to said first member.

14. A stabilization system as set forth in claim 13 wherein said first member has a generally planar step portion.

15. A stabilization system for stabilizing a liftgate relative to vehicle structure of a motor vehicle when in a closed position comprising:

a first member for mounting on either the liftgate of the vehicle structure;

a second member for mounting on the other of the liftgate and the vehicle structure;

said first member comprising a block formed of a resilient material having a generally solid base portion for mounting on the one of the liftgate and the vehicle structure and a generally hollow outer portion;

said second member comprising a block formed from a generally rigid material having a base portion for mounting on the other one of the liftgate and the vehicle structure and a tapered outer portion, said tapered outer portion being pressed against said hollow outer portion of said first member when the liftgate is in the closed position such that said hollow outer portion winks over said tapered outer portion of said second member and secures said second member thereagainst to prevent movement of said second member in at least two directions with respect to said first member;

wherein said first member has a generally planar step portion; and wherein said step portion has at least one aperture extending therethrough.

16. A stabilization system as set forth in claim 14 wherein said outer portion of said first member has a generally planar shoulder portion perpendicular to said step portion.

17. A stabilization system for stabilizing a liftgate relative to vehicle structure of a motor vehicle when in a closed position comprising:

a first member for mounting on either the liftgate of the vehicle structure;

a second member for mounting on the other of the liftgate or the vehicle structure;

said first member comprising a block formed of a resilient material having a generally solid base portion for mounting on either the liftgate or the vehicle structure and a generally hollow outer portion;

said second member comprising a block formed from a generally rigid material having a base portion for mounting on either the liftgate or the vehicle structure and a tapered outer portion, said tapered outer portion being pressed against said hollow outer portion of said first member when the liftgate is in the closed position such that said hollow outer portion winks over said tapered outer portion of said second member and secures said second member thereagainst to prevent movement of said second member in at least two directions with respect to said first member;

wherein said first member has a generally planar step portion; and wherein said outer portion of said first member has a rib portion interconnecting said base portion and said step portion.

18. A stabilization system as set forth in claim 13 wherein said tapered outer portion of said second member has a generally planar first portion and a generally planar second portion generally perpendicular to said first portion.

19. A stabilization system as set forth in claim 13 wherein said tapered outer portion of said second member has a cavity and a wall to divide said cavity.

20. A stabilization as set forth in claim 13 wherein said base portion of said first member has at least one aperture extending therethrough and at least one fastener passing through said at least one aperture to secure said base portion to one of the openable member and the vehicle structure.

* * * * *